May 6, 1924.

E. ST. V. WILLIAMS

ICE CREAM CONE HOLDER

Filed July 26, 1921

1,493,137

Inventor
E. St. V. Williams
By D. Swift
Attorney

Patented May 6, 1924.

1,493,137

UNITED STATES PATENT OFFICE.

EARL ST. VINCENT WILLIAMS, OF GRAND FORKS, NORTH DAKOTA.

ICE-CREAM-CONE HOLDER.

Application filed July 26, 1921. Serial No. 487,579.

*To all whom it may concern:*

Be it known that I, EARL ST. VINCENT WILLIAMS, a citizen of the United States, residing at Grand Forks, in the county of Grand Forks, State of North Dakota, have invented a new and useful Ice-Cream-Cone Holder; and I do hereby declare the following to be a full, clear, and exact description of the invention, such as will enable others skilled in the art to which it appertains to make and use the same.

The invention relates to ice cream cone holders and has for its object to provide a device of this character wherein the lower end of a conventional form of bag is provided with a semi-circular cutaway portion thereby forming an aperture for the reception of a tapered ice cream cone and holding said ice cream cone in the bag and the bag not only forming means for supporting and holding the cone, but also forming means for protecting the ice cream from foreign matter as the cone is moved from place to place.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
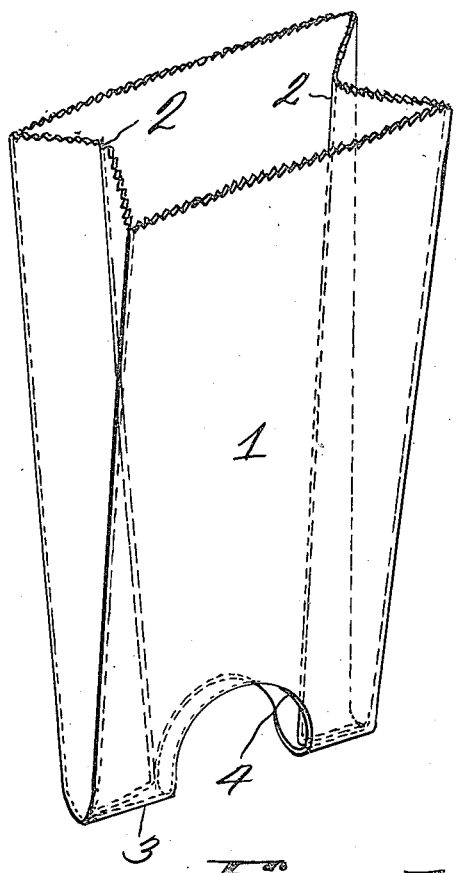
Figure 1 is a perspective view of one of the holders, showing the same in folded position.
Figure 2:
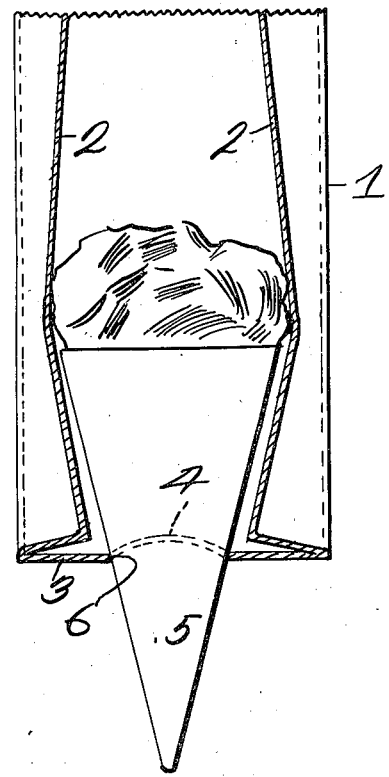
Figure 2 is a vertical transverse sectional view through the cone holder, showing a cone disposed therein.

Referring to the drawings, the numeral 1 designates a cone holder which cone holder is made from a conventional form of paper bag, said bag being provided with the inwardly extending folds 2, which permit the bag as a whole to be flattened for storage and shipping purposes. The closed end 3 of the bag when in flat condition is cut away in such a manner as to form a recess 4 semi-circular shaped, which recess when the bag is open will form a substantially round opening for the reception of the tapered cone 5. The opening is designated by the numeral 6 and is of less diameter than the greatest diameter of the cone 5 thereby holding the cone against downward movement when the cone is placed therein. Opening 6 is preferably of sufficient diameter to correspond with the diameter of the cone 5 substantially centrally of said cone, however it is to be understood that said opening may be of any desired size. After the cone has been placed in the holder as shown in Figure 2 the top of the bag may be folded together for excluding foreign matter when the holder with a cone therein is being moved from place to place, for instance from the store where it is purchased and disposed to the home, which is often the case with children.

From the above it will be seen that a cone holder and protector is provided which is simple in construction and one which may be cheaply made and sold.

The invention having been set forth what is claimed as new and useful is:—

An ice cream holder comprising a fibrous receptable substantially V-shaped in vertical transverse cross section, said receptacle having front and rear walls, an opening in the bottom of the receptacle of less diameter than the greatest diameter of a cone to be held therein, the opposite sides of the receptacle being provided with inwardly extending vertical ribs V-shaped in horizontal cross section adapted to engage opposite sides of a cone of ice cream and prevent tilting of said cone in a vertical longitudinal plane, said front and rear walls being adapted to engage opposite sides of a cone of ice cream and prevent tilting thereof in a vertical transverse plane.

In testimony whereof I have signed my name to this specification in the presence of two subscribing witnesses.

EARL ST. VINCENT WILLIAMS.

Witnesses:
TRESSIE E. ROAT,
L. McNEIL.